Oct. 6, 1936.                C. G. HARBORDT                2,056,786
                       REFRIGERATING METHOD AND APPARATUS
                            Filed July 3, 1933          2 Sheets—Sheet 1
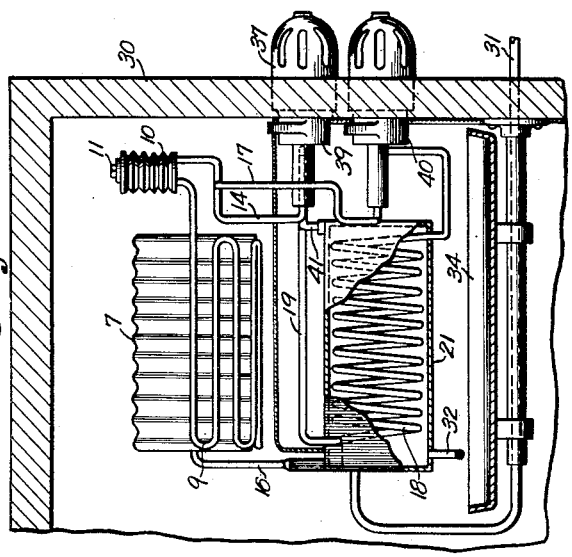
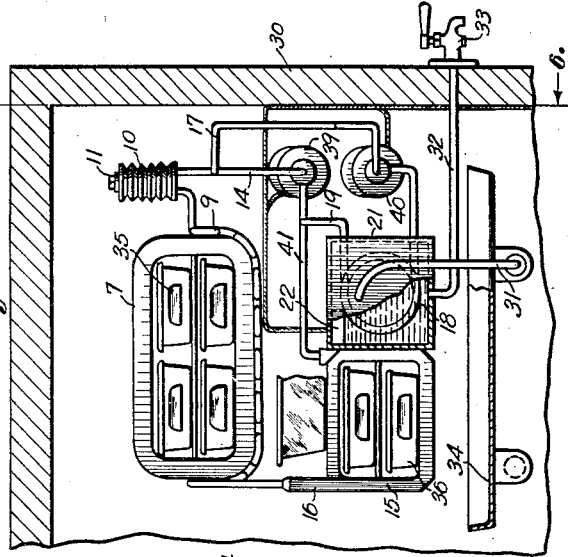
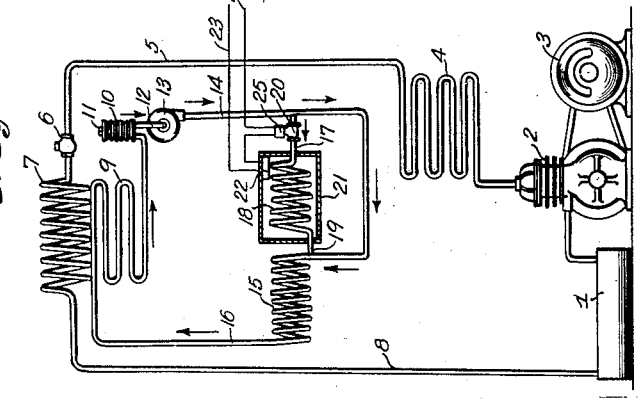
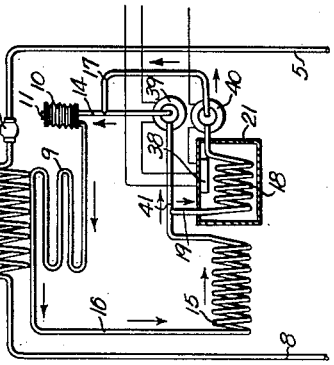
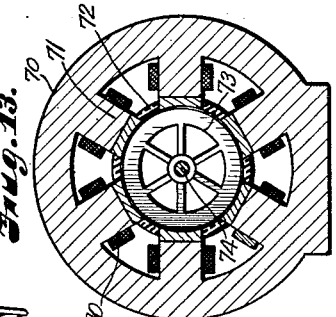
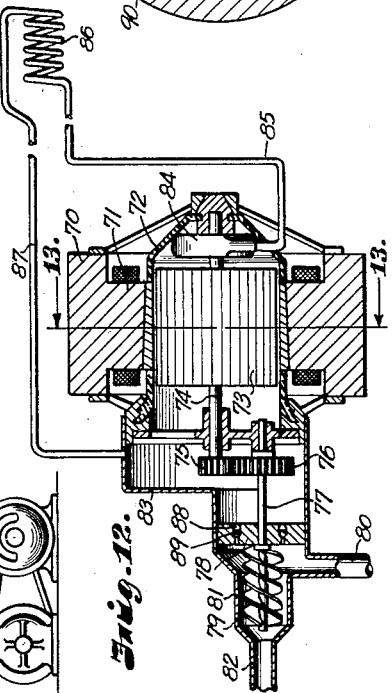
INVENTOR
Carl G. Harbordt
BY Thos. F. Scofield
ATTORNEY Oct. 6, 1936.  C. G. HARBORDT  2,056,786
REFRIGERATING METHOD AND APPARATUS
Filed July 3, 1933  2 Sheets-Sheet 2
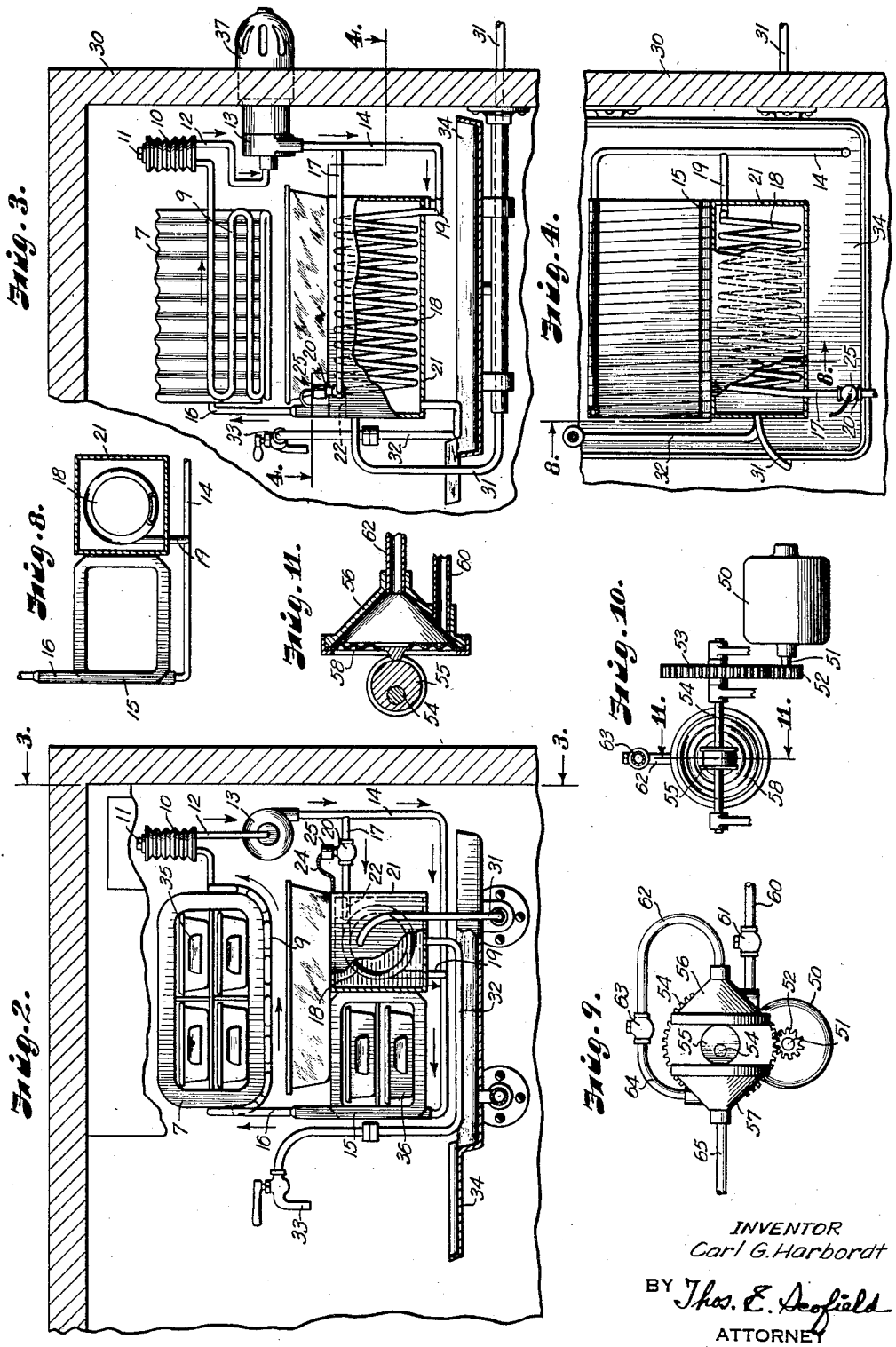
INVENTOR
Carl G. Harbordt
BY Thos. E. Scofield
ATTORNEY Patented Oct. 6, 1936

2,056,786

UNITED STATES PATENT OFFICE 2,056,786

REFRIGERATING METHOD AND APPARATUS

Carl G. Harbordt, Kansas City, Mo.

Application July 3, 1933, Serial No. 678,788

7 Claims. (Cl. 62—170)

My invention relates to a refrigerating method and an apparatus for carrying out the same.

Currently, it has become increasingly popular to use mechanical refrigerating systems in the home for preserving food, vegetables, milk, and the like, instead of resorting to ice boxes as used to be the practice. It has been suggested that a water cooler be attached to a mechanical refrigerating device but it was found that difficulty was experienced in that, in times of small demand, the water would freeze, causing difficulty. Then, too, it was found that, in times of unusual demand, an increased load was thrown upon the refrigerating system, with the result that its function in preserving food and drink was impaired in that the required temperature could not be maintained.

One object of my invention is to provide a method of refrigerating which may be employed for cooling drinking water by means of an ordinary refrigerating system such as used in the home for preserving food and drink.

Another object of my invention is to provide a method and apparatus which will prevent peak loads from being thrown on the refrigerating apparatus when a large supply of cold water is needed.

Another object of my invention is to provide a separate, hermetically sealed refrigerating medium which may be employed for any cooling use which is desired in conjunction with a mechanical refrigerating system.

Another object of my invention is to provide a circulating stream of refrigerant liquid in hermetically sealed condition.

Further objects will appear from the following description.

In the accompanying drawings which form part of the instant specification and are to be read in conjunction therewith, and in which like numerals are used to represent like parts in the various views;

Figure 1 is a schematic view of one mode of carrying out my invention.

Figure 2 is a sectional view showing one form of apparatus for carrying out my invention, as installed in a mechanical refrigerator of any suitable type.

Figure 3 is a sectional view with parts broken away, taken on a line 3—3 of Figure 2.

Figure 4 is a sectional view taken on a line 4—4 of Figure 3.

Figure 5 is a sectional view embodying another form of carrying out my invention, as installed in a mechanical refrigerator such as used in the home.

Figure 6 is a sectional view taken on a line 6—6 of Figure 5.

Figure 7 is a schematic view of the form of apparatus shown in Figures 5 and 6, capable of carrying out my method.

Figure 8 is a sectional view taken on a line 8—8 of Figure 4.

Figure 9 is a detail view showing one form of pumping means adapted to pump a hermetically sealed circulating fluid.

Figure 10 is a side elevation of the pump shown in Figure 9.

Figure 11 is a sectional view taken on a line 11—11 of Figure 10.

Figure 12 is a diagrammatic sectional view of another form of pump for circulating a hermetically sealed ring of circulating fluid.

Figure 13 is a sectional view taken on a line 13—13 of Figure 12.

In general, my invention contemplates the provision of a circulating ring of non-freezing liquid. By non-freezing, I mean any suitable liquid which has a low freezing point. Glycerin, oil, or compressed gases sufficiently compressed to be in a liquid state, may be employed. The circulating ring of liquid has a coil or heat exchange member in heat exchange relationship with a refrigerating coil of a mechanical refrigerator. By mechanical refrigerator, I mean any type of refrigerating device, including the expansion and compression, as well as the absorption type. Means are provided for continuously circulating the liquid in heat exchange relation with the refrigerating coil. One coil of extended area is placed in the ring and the liquid is adapted to be continuously circulated therethrough. Means are provided for intermittently placing another coil within the circulating ring so that all or a part of the circulating liquid may pass therethrough. This second coil is adapted to be placed in a water cooler. Thermostatic means are provided for cutting the second coil out of the circulating ring as the temperature of the liquid to be cooled reaches a predetermined point. The coil which is always in the circulating ring may be used to perform a useful refrigerating function and, as will be hereinafter more fully pointed out, will act as a refrigerating equivalent of a mechanical fly-wheel, to use an analogy.

More particularly referring now to the drawings, a refrigerating fluid such as sulphur dioxide, ammonia, ethyl chloride, or the like, from tank 1 is compressed in compressor 2, which is driven by motor 3, cooled in condenser 4 in any suitable manner and passed through line 5, through expansion valve 6 to refrigerating coil 7 which may be of any suitable type, and returned through line 8 to tank 1. This refrigerating cycle is well known. If desired, an absorption system of refrigeration may be employed. The refrigerating coil 7 of a mechanical refrigerating system is placed in heat exchange relation with a coil 9 of the circulating ring of my invention. Any suitable form of heat exchanger may be used. The coil 9 may be in physical contact with the coil 7, or both be immersed in a container filled with a heat transferring liquid. The circulating ring of which coil 9 forms a part, comprises an expansion chamber 10, fitted with a filling opening, closed by a plug 11 to permit accommodation for changes in volume due to expansion or contraction of the fluid. The expansion chamber 10 is connected by line 12 to a pump or impeller 13 which is connected to line 14. Line 14 communicates with an elongated coil 15 which is connected by pipe 16 to coil 9.

A shunt circuit is provided comprising line 17 connected to pipe 14 and leading to coil 18 which is connected by line 19 to coil 15. A valve 20 is interposed in line 17 to control the shunt circuit. The coil 18 is disposed in a tank 21 into which the water to be cooled is passed. A thermostat 22 is disposed within the tank 21 in contact with the water therein. The thermostat is interposed in the electric mains 23 and 24 in which a solenoid 25 which controls valve 20 is interposed. It will be seen that the opening and closing of the switch within thermostat 22 will determine the energization of the solenoid 25 to control valve 20.

Let us assume that the system has just started operating. The water in tank 21 is warm so that the thermostat 22 is in a position to keep valve 20 open. The pump 13 which is driven by any suitable motor, will send circulating fluid through line 14 where it will branch and pass through line 17, through coil 18, while part of it passes directly through coil 15 into which the fluid passing through coil 18 eventually passes, then through line 16, through coil 9, which is in heat exchange relation with refrigerating coil 7. The circulating fluid passing through both coils 15 and 9 will become cooler as the circulation progresses. The coil 18 will cool the water in tank 21 until the water has reached the desired temperature at which the thermostat 22 is set to operate. When this occurs, the thermostat will energize the solenoid 25 and close valve 20. The circulating fluid will then pass only through coil 15 to coil 9. It will be observed that the danger of freezing water in tank 21 is precluded while at the same time interfering not at all with the operation of the mechanical refrigerating system of which refrigerating coil 7 is a part. Thus the mechanical refrigerating system can be operated independently of the water cooling system. The circulating ring of fluid will continue to circulate through coils 9 and 15, becoming increasingly colder. The low temperature of the liquid furnishes a reserve, as will be hereinafter more fully pointed out. At the same time, any liquid in which coil 15 may be immersed will become cold and furnish an additional reserve. If desired, coil 15 may be put to use for freezing water in the usual ice trays.

Let us assume that, for some reason, a sudden demand arises for cold water. The withdrawal of water from tank 21 which is connected to the city water supply, will cause the introduction of water of higher temperature into the tank. When this occurs, the thermostat 22 will operate to cause valve 20 to be opened and part of the circulating ring of fluid will again pass through coil 18. This fluid, of course, is extremely cold, due to the fact that it has been continuously circulated and the heat is absorbed not only by the circulating ring of fluid but also by the liquid in which coil 15 may be immersed or by the ice which has been formed by coil 15. It will now become apparent that the use of a large volume of circulating fluid by means of the use of coil 15 will act as a fly-wheel and relieve the mechanical refrigerating system of peak loads which would be occasioned by a large demand for cold water.

Referring now to Figures 2, 3, and 4, I show my system installed in a small mechanical refrigerator 30 such as used in the home. Like reference numerals are used to indicate like parts so that Figure 1 can be read in conjunction with Figure 2. The water tank 21 is provided with a pipe 31 leading from the city water supply. The cold water is withdrawn from tank 21 through line 32 which terminates in a faucet 33. The unit is supported in any suitable manner and may be provided with a tray 34 on which a glass or other container is placed to withdraw the water. The faucet 33 may terminate outside the refrigerator 30 if desired. The usual ice trays 35 are employed in connection with the refrigerating coil 7. Ice trays 36 may be placed within "fly-wheel" coil 15. The pump 13 is driven by a suitable electric motor 37 which is disposed outside of the refrigerator.

Referring now to Figure 7, another mode of carrying out my method is shown. The thermostat 38 disposed in tank 21 of Figure 7 is a different type in that it is a double contact thermostat and controls the motors of pumps 39 and 40. The operation of the method shown in Figure 7 will be readily understood from the following description. Let us assume that the water in tank 21 is warm and the system is just being started. The connections are such that pump 39 is stopped and pump 40 is running. Fluid from coil 9 which is in heat exchange relation with refrigerating coil 7 passes through line 16, through "fly-wheel" coil 15, through line 19, through coil 18, through pump 40, through line 17, to pipe 14, to the expansion chamber 10, back to coil 9. It will be seen that the circulating fluid will cool the water in tank 21 until such time as the desired temperature has been reached. At this time, the thermostat will operate to start the motor to pump 39, while stopping the motor of pump 40. The circulating ring will then be comprised by coil 9, line 16, "fly-wheel" coil 15, line 41, pump 39, pipe 14, and expansion chamber 10. It will also be apparent that, if desired, pump 39 may be allowed to run at all times, while thermostat 38 is replaced with a single contact thermostat to control the operation of the motor of pump 40 only. In the first instance, all of the circulating fluid will pass through coil 18 inasmuch as pump 39 is stopped when pump 40 is started. In the second case, pump 40, operating at the same time as is pump 39, will act as a bleeder to withdraw part of the circulating ring therefrom and shunt it through coil 18. Either type of operation may be used and be within the spirit of my invention.

Figures 5 and 6 represent one embodiment of the method shown in Figure 7 installed in a small mechanical refrigerator. It will be observed that faucet or spigot 33 is disposed outside of the refrigerator casing 30.

The use of a hermetically sealed circulating ring of non-freezing liquid is an important feature of my invention. There is no danger of leakage of the circulating non-freezing liquid into the ice box, if a hermetically sealed system is used. The importance of this cannot be overestimated, inasmuch as the leakage of the circulating fluid will contaminate the food which might be present in the ice box. No moisture or water can leak into a hermetically sealed system so that the danger of clogging the system by the frozen, accumulated moisture is obviated. No replacement of circulating fluid will be necessary if a hermetically sealed ring is used. The use of stuffing boxes, with the accompanying necessity of stuffing box repair is obviated. A wider choice of circulating, non-freezing liquids is permissible by hermetically sealing the circulating system.

Because my system is hermetically sealed, I must resort to a pump driving means for my impeller pump, or the use of a different pumping system which will circulate the liquid while hermetically sealed. Attention is invited to Figures 9, 10, and 11 in which a motor 50 drives a motor shaft 51, to which a pinion 52 is secured. The pinion 52 drives a gear 53 which is keyed to a shaft 54, which carries a cam or an eccentric 55. The cam 55 is disposed between two pumping chambers 56 and 57, which are provided with flexible diaphragms 58 which are placed tangent to the cam 55. The construction is such that, when one diaphragm 58 of pumping chamber 56 is depressed, the diaphragm of pumping chamber 57 is extended. The fluid to be pumped enters pipe 60 and passes through check valve 61 into pumping chamber 56. As diaphragm 58 of pumping chamber 56 is depressed, the volume of chamber 56 is decreased. The check valve seats and the fluid being pumped passes from chamber 56 through line 62, through check valve 63, through line 64, into pumping chamber 57. The cam 55 rotating now depresses diaphragm 58 of pumping chamber 57, seating the check valve 63 and forcing the fluid out through pipe 65. Pipes 65 and 60 are connected to a closed system which is completely filled with circulating fluid. It is believed that the operation of the pumping arrangement will be clear from the above description. It will be observed that the system is hermetically sealed, there being no opportunity for leakage or seepage of moisture and air into the system from external sources.

Referring now to Figures 12 and 13, another mode of pumping fluid through a hermetically sealed system is shown. The starter 70 of an alternating current motor has pole pieces 71, extending through or imbedded in a casing 72 made of a phenol condensation product, fibre, or any suitable insulating impervious material. Within the casing 72 is disposed the rotor 73 connected to a shaft 74 supported in suitable bearings. A pinion 75 is keyed to shaft 74 and is adapted to drive gear 76 which is keyed to shaft 77 which is supported in suitable bearings and passes through a partition 78. The upper portion of shaft 77 carries an impeller 79 which may be of any suitable type. The fluid being pumped enters through pipe 80 and passes through the impeller casing 81 and is discharged through pipe 82, it being understood that pipes 82 and 80 are connected in a hermetically sealed closed circulating system through which non-freezing liquid passes. Casing 72 is joined in sealed relation with casing 83. It will be observed that a portion of the fluid being pumped may be passed into casing 83 and casing 72, the circulating fluid in this case completely surrounding the rotor 73 and being of an insulating type. The shaft 74 of the motor carries at its opposite end a small pump 84 which is adapted to circulate the fluid within casing 72, through pipe 85, through coil 86, through line 87, through casing 83, back into the motor casing. Coil 86 is placed in heat exchange relation with any suitable cooling medium and, if desired, may be installed in the jacket of the water cooler. It will be observed that the motor is kept very cool by means of this cooling system. Partition 78 is provided with passages 88 which are fitted with check valves 89. Fluid may flow through the passages 88 slowly, but any rapid movement of fluid from pumping chamber 81 to motor casing 83 is prevented, it not being desired that the heat generated by the motor be allowed to be imparted to the circulating ring of non-freezing liquid. The pole pieces 71 are provided with suitable windings 90. It is believed that the operation of the pumping system will be clear from the foregoing description.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. The method of refrigerating including the steps of continuously circulating a liquid of low freezing point in a hermetically sealed, closed circuit, absorbing heat from said liquid at one point in the circuit and diverting a part of said liquid through a heat exchange zone in heat exchange with fluid to be refrigerated in response to a function of the temperature of the fluid to be refrigerated.

2. A cooling apparatus including in combination a refrigerating system having a refrigerating coil disposed in the compartment to be refrigerated, a second compartment disposed within said first compartment, a liquid container disposed within said first compartment, a first heat exchange coil positioned in heat exchange relation with said refrigerating coil, a second heat exchange coil positioned in said second compartment, a third heat exchange coil positioned in said liquid container, means for continuously circulating a liquid of low freezing point through said first and second heat exchange coils in series, and means for intermittently diverting a part of said liquid through said third heat exchange coil.

3. A cooling apparatus including in combination a refrigerating system having a refrigerating coil disposed in the compartment to be refrigerated, a second compartment disposed within said first compartment, a liquid container disposed within said first compartment, a first heat exchange coil positioned in heat exchange relation with said refrigerating coil, a second heat exchange coil positioned in said second compartment, a third heat exchange coil positioned in said liquid container, means for continuously circulating a liquid of low freezing point through said first and second heat exchange coils in series, and means responsive to the temperature in said liquid compartment for intermittently diverting a part of said liquid through said third heat exchange coil.

4. In combination with a mechanical refrigerator having a refrigerating system including a refrigerating coil, a storage compartment disposed within said refrigerator, a liquid cooling compartment disposed within said refrigerator, a heat exchanger in heat exchange relation with said refrigerating coil, an elongated coil for cooling said storage compartment, a third coil for cooling said liquid compartment, means for continuously circulating a liquid of low freezing point through said heat exchange coil and said elongated coil, and means for intermittently passing a portion of said liquid through said liquid cooling coil.

5. In combination with a mechanical refrigerator having a refrigerating system including a refrigerating coil, a storage compartment disposed within said refrigerator, a liquid cooling compartment disposed within said refrigerator, a heat exchanger in heat exchange relation with said refrigerating coil, an elongated coil for cooling said storage compartment, a third coil for cooling said liquid compartment, means for continuously circulating a liquid of low freezing point through said heat exchange coil and said elongated coil, and means responsive to the temperature in said elongated coil for intermittently passing a portion of said liquid through said liquid cooling coil.

6. In a refrigerating system a refrigerating means and a heat exchange coil connected in series, means for continuously circulating a low freezing point liquid through said refrigerating means and said heat exchange coil and means for intermittently diverting a portion of said low freezing point liquid through another heat exchange coil.

7. In a refrigerating system a refrigerating means and a heat exchange coil connected in series, means for continuously circulating a low freezing point liquid through said refrigerating means and said heat exchange coil, and means responsive to temperature for intermittently diverting a portion of said low freezing point liquid through another heat exchange coil.

CARL G. HARBORDT.